United States Patent [19]

Appleberry

[11] 4,318,522
[45] Mar. 9, 1982

[54] GIMBAL MECHANISM
[75] Inventor: Walter T. Appleberry, Long Beach, Calif.
[73] Assignee: Rockwell International Corporation, Downey, Calif.
[21] Appl. No.: 35,121
[22] Filed: May 1, 1979
[51] Int. Cl.³ .................... A45B 19/04; A47J 47/16
[52] U.S. Cl. .................................. 248/178; 248/661; 248/276
[58] Field of Search ............... 248/178, 179, 127, 556, 248/660, 661, 276; 350/82, 85; 343/763, 766; 74/66, 52; 285/179, DIG. 21

[56] References Cited
U.S. PATENT DOCUMENTS

| | | | |
|---|---|---|---|
| 2,457,340 | 12/1948 | Berry | 248/556 |
| 2,465,790 | 3/1949 | Campbell | 248/556 |
| 2,585,579 | 2/1952 | Norden | 343/766 X |
| 2,740,962 | 4/1956 | Hammond | 343/766 X |
| 2,761,638 | 9/1956 | Getline | 248/556 |
| 2,886,262 | 5/1959 | Fletcher | 285/179 X |
| 2,933,891 | 4/1960 | Britt | 285/DIG. 21 |
| 3,356,437 | 12/1967 | Beamish | 350/85 X |
| 3,467,350 | 9/1969 | Tyler | 248/179 |
| 4,073,201 | 2/1978 | Taylor | 248/179 X |

FOREIGN PATENT DOCUMENTS

| | | | |
|---|---|---|---|
| 6414146 | 6/1965 | Netherlands | 248/179 |
| 1042258 | 9/1966 | United Kingdom | |

Primary Examiner—J. Franklin Foss
Attorney, Agent, or Firm—Harold C. Weston; H. F. Hamann

[57] ABSTRACT

A novel gimbal mechanism utilizes one or more support arms so rotatably coupled to support structure and to an article whose position is to be controlled as to permit such article to be reoriented along any axis within a cone defined by axes of rotation of the gimbal's support arms.

9 Claims, 18 Drawing Figures

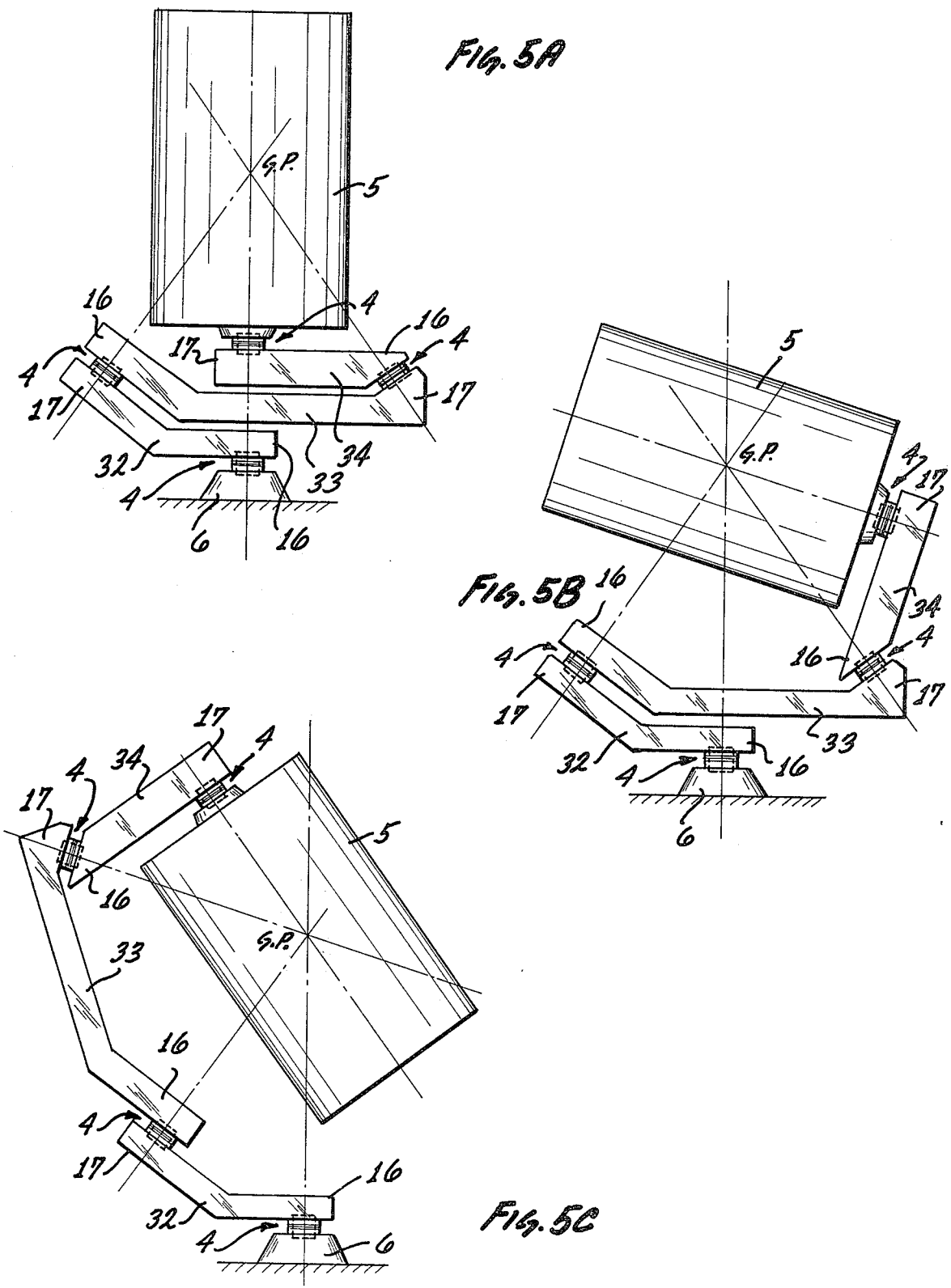

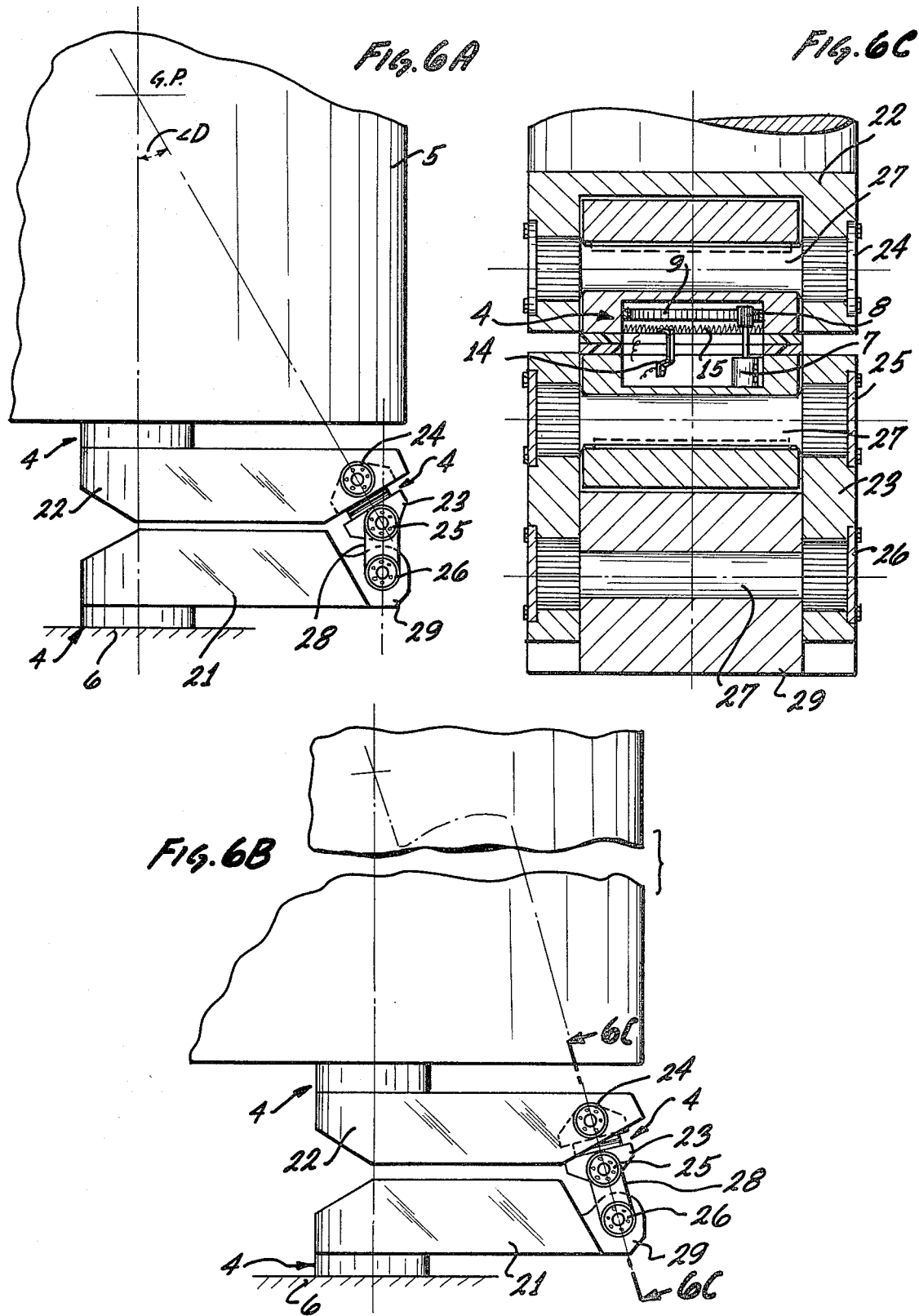

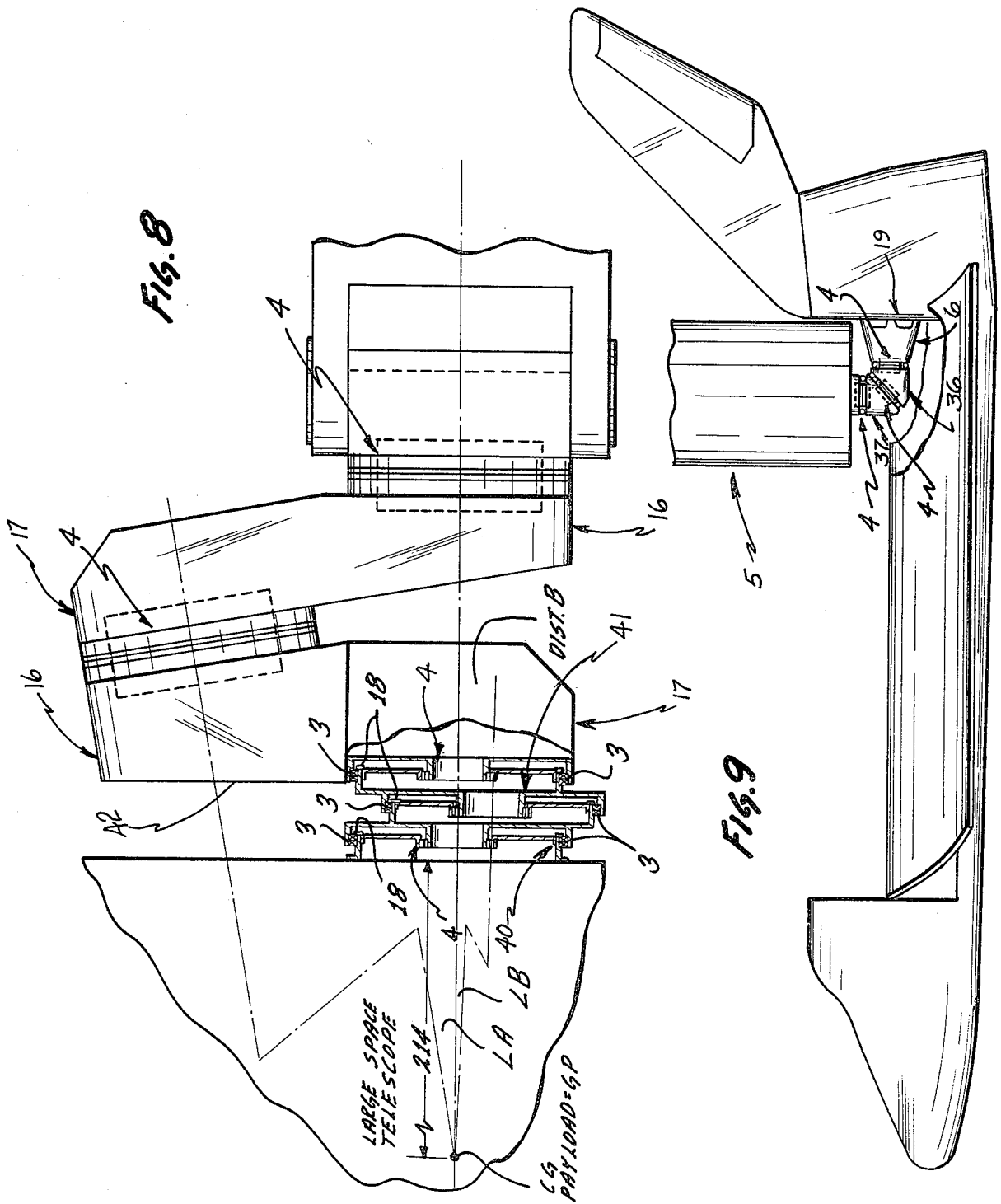

GIMBAL MECHANISM

BACKGROUND OF THE INVENTION

1. Field of the Invention

This invention relates to gimbal mechanisms and, more particularly, to a mechanism allowing controllable reorientation of an article about a spatial point. The spatial point may be selected as the center of mass of the article so that only angular momentum changes are involved in its reorientation. The gimbal mechanism utilizes large bearing surfaces between its rotatably coupled support arms and requires greater travel of these support arms, for a given amount of article reorientation, than does a conventional gimbal. Such features provide a high degree of "gimbal stiffness" and improved article pointing accuracy.

2. Description of the Prior Art

Gimbal mechanisms are well known in the mechanical arts. In its simplest form a gimbal can be found in the bearing supported freedom of a magnetic compass needle, the gimbal allowing the needle freedom to orient itself at an arbitrary horizontal (yaw) orientation with respect to its housing. Freedom in yaw and pitch, a two degree of freedom gimbal suspension system, is found in the means used to support coin operated telescopes at scenic spots of public parks. A three degrees of freedom gimbal is found in the mechanism used by attitude sensing gyroscopes in aircraft and space platforms to support a spinning inertial mass, allowing that mass to maintain a fixed spatial orientation as the airfram or space platform supporting the gimbal changes attitude.

While some gimbal systems function in a completely passive mode to support an article or device, most of them possess means to cause displacement of the gimbal elements and include position sensors to measure and control reorientation of the supported article. Fundamental to all gimbal systems is their ability to provide freedom of orientation of an axis fixed in an article or device about the axes defined by the system.

The within invention is of the class incorporating drive means and control sensor systems. Such drives and sensors may be any of a large class and are not specified herein as part of this invention although they comprise a fundamental requirement for practical application of the same.

Conventional gimbals (see FIG. 1) are generally bulky and massive since they must extend from a support or mounting base to points near the center of gravity of the articles they support. Such gimbals used for large telescopes, antennae, solar panels and machinery designed for industrial purposes are not compatible with requirements of present day spacecraft which are possessed of limited volume and severe payload weight restrictions.

A second class of gimbal is well known that conveniently attaches to the external envelope or structure of the orientable device and is thus more compact than the conventional type. A drawback to this class is that the gimbal point, i.e. the point about which reorientation is achieved, lies within the pointer mechanism itself (see FIG. 2), and large excursions of the supported device's center of gravity are required to effect device reorientation. Such excursions require large driving torques at driving points and introduce undesirable perturbations to base structure through reaction between the gimbals and their supporting base.

Problems to be solved with respect to pointing massive payload devices such as telescopes, antennae and machinery to be used for space industrialization have been studied in detail. A survey of existing pointer concepts usable with NASA's Space Shuttle and integrated payload platforms presented a number of potential solutions.

One of these utilizes an end mounted support mechanism to raise and reorient a payload device from its transport position in the Space Shuttle cargo bay to the operational condition desired. Such a system is well within current technology and utilizes well known means of energizing pointer motors or mechanisms and sensing means to control positioning (see FIG. 2).

The second solution, subject of this application, utilizes an array of support arms rotatably coupled together whose axes of rotation all meet at a common point, the center of mass of the payload device to be reoriented. Such a system, supporting a massive payload device, would involve a disturbance impulse to the system support base (Space Shuttle or payload platform) as the device is placed into operation from its transport position, but, thereafter, the only torques experienced by that support base are those arising from changes in angular momentum of the device about its own center of gravity.

This system incorporates certain desirable features of the first solution. It provides for attachment to the end or outer envelope of the supported article, yet provides for reorientation about the article's center of gravity, eliminating translational moment of inertia changes and reducing reaction torques on base structure to those resulting from the consequent changes in angular momentum.

It also incorporates large bearing surfaces between gimbal elements so that disturbance torques are distributed over a larger area than is possible with conventional gimbals. In conventional gimbals, disturbance forces are concentrated at the attachment points or axes of gimbal elements and effects adverse to stability of pointing occur when corrective torques are applied at these attach points. Overcorrection and "dither" generally occur so that "hunting" of close driven servos takes place.

Another significant feature of this invention is the perpendicular orientation of the support arm axes of rotation with respect to their supporting bearing surfaces. With such a perpendicular orientation, inerital bending moments are supported primarily by the bearings rather than by the axis pins themselves, greatly increasing gimbal stiffness. In contract (see FIGS. 1 and 2) driving joints of conventional gimbals are reacted to at the gimbal element drive means proper.

In conventional systems, a change in pitch or yaw of the payload article requires a corresponding change in angular displacement of the concerned gimbal joint. Since it is the joint that is controlled, error in the joint angle is equal to error in pointing of the article. In the mechanism of this invention, the joints traverse significantly greater angles for a given article angular displacement than do the joints of a conventional gimbal. With the same accuracy sensor, the article supported by the within disclosed gimbal can be pointed with greater accuracy than can the same article supported by a conventional gimbal. The disclosed gimbal may be identified as an exocentric gimbal to characterize its principal difference from the conventional type.

A variety of rotary and angular support devices has been in existence for many years. Gyroscope suspension means have been described in U.S. Pat. No. 3,354,726 and references cited therein, while rotary joints have been described in such patents as U.S. Pat. Nos. 2,886,262, 2,933,891, 3,284,030 and others. In none of the above, however, has the objective of achieving a suspension system such as that of the exocentric gimbal been addressed. Providing three degrees of freedom motion, with end mounting, of an extended dimension device, controllable in orientation about a selectable point, is an achievement attainable only through use of the device presented herein.

SUMMARY OF THE INVENTION

The within invention, referred to as an exocentric gimbal, comprises an arrangement of one or more support arms mechanically coupled to each other at axial coupling joints, the innermost support arm being coupled to an orientable article (payload device), and the outermost to a support base or mounting surface. Coupling between support arms is effected by axial pins which provide rotational freedom of the arms at an extended bearing surface or attachment plane between them, the pins being positioned at the center of the bearing surfaces for the preferred embodiments described below.

The payload device may be coupled to the innermost support arm through a corresponding axial pin at the attachment plane to provide a "roll" degree of freedom for the payload. It may also be fixedly mounted to that support arm without effect on the novelty claimed herein.

The outermost support arm is rotatably mounted to a structural support base and each rotatable joint of the gimbal is equipped with motive and sensor means to allow the support arms and payload device to be repositioned to orientations desired.

Each support arm functions as an angulated crank having two planes and two axes of rotation, each axis being perpendicular to its corresponding plane. Although any of the support members, payload or structural support assemblies may impose limits on the amount of travel of gimbal support arms, the discussions below are premised on preferred embodiments of the invention, limitations and variations of which will be readily apparent to any person of ordinary skill in this area of technology.

One of the more pressing needs in today's space technology is for a device minimizing weight and structural bulk which allows use of articles, such as telescopes, lasers, antennas and machinery for industrialization of space, on orbital platforms and earth satellites of all descriptions. Accordingly:

It is an object of this invention to provide a gimbal mechanism which supports an article from a location on the external envelope of that article and allows for orientation of the article along a set of axes passing through a given spatial point.

Another object of the invention is to provide a mechanism which allows precise positioning and reorientation of large objects operating from an inertial platform with minimal reactive torques coupled to that platform upon such reorientation.

A further object of this invention is to provide an article positioning mechanism allowing for reorientation of such articles about a spatial point, that point being adjustable through variation of inclination of bearing surfaces integral to the mechanism.

Yet another object of this invention is to provide a mechanism for support of an article which allows the article to be reoriented along a continuum of axes passing through a point internal to the article where attachment between the article and the mechanism is at a location on the exterior envelope of the article.

BRIEF DESCRIPTION OF THE DRAWINGS

FIGS. 5a, 5b and 5c is a three support arm exocentric gimbal showing such gimbal in three different positions of support.

FIGS. 6a, 6b and 6c is a schematic representation of means usable to vary inclination of bearing planes of the gimbal with discrete, manual, adjustment.

FIG. 8 illustrates a series combination of exocentric gimbals to increase accuracy and precision of device orientation.

FIG. 9 illustrates a skewed gimbal utilizing three rotary joints.

DESCRIPTION OF PREFERRED EMBODIMENTS

Scientific and industrial utilization of outer space imposes an involved array of constraints and cautions on mechanical systems deployed there. Such systems and their associated equipments must be affixed to some type of structural platform or inertial table.

Such a platform and its equipments present a free floating system in which interaction between the platform and those equipments produces precisely predictable motions and reactions, all of which must be controlled and accounted for to achieve useful benefits from the processes carried out by the system.

One of the most significant of the processes utilized by space systems is that of pointing or orienting massive and bulky objects such as solar panels, large telescopes, antennas and, in the foreseeable future, bulky industrial machinery. The device of this invention, referred to as an exocentric gimbal, is designed to provide for such operations while producing minimum interaction with the space platform, and, at the same time, providing appreciable increases in accuracy and stability over conventional pointer systems.

Exocentric gimbals may be constructed in a variety of physical configurations and the preferred embodiments described below are merely illustrative of the possibilities.

Figure 7A:
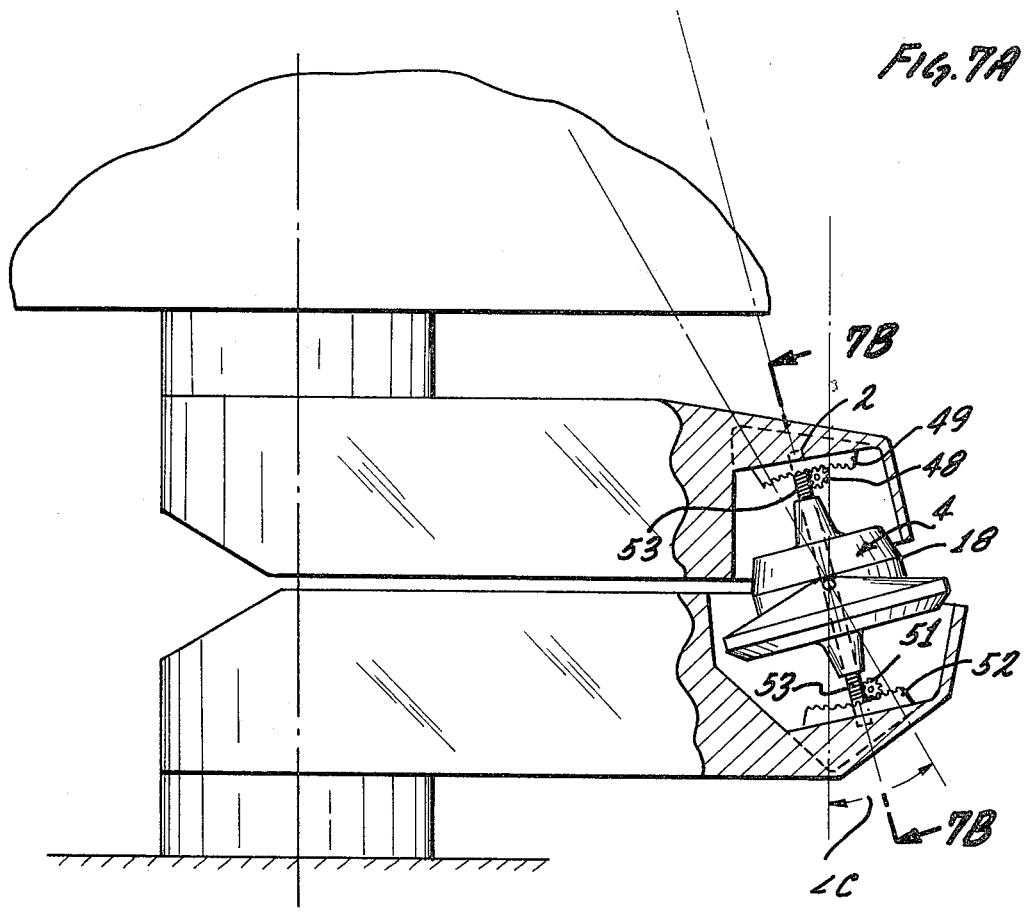
FIGS. 7a and 7b is a schematic representation of means usable to vary inclination of bearing planes remotely through use of controllable motive sources.
Figure 10A:
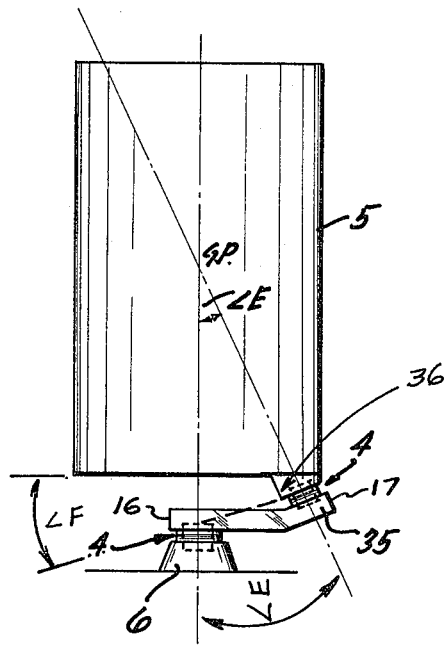
FIGS. 10a and 10b illustrates a basic exocentric gimbal with one support arm.
Figure 10B:
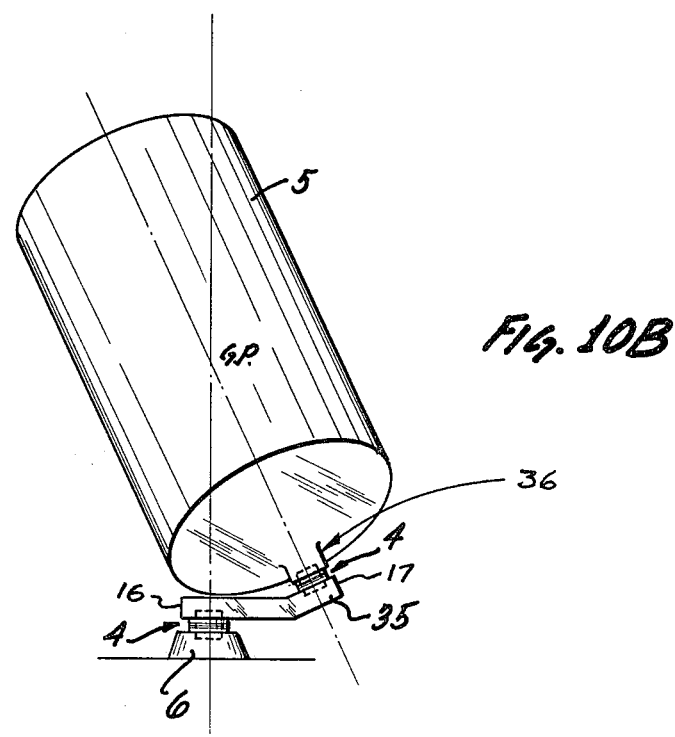

Principles of the exocentric gimbal are best explained by referring to FIG. 10. In FIG. 10 is illustrated a basic pointer mechanism comprised of a single support arm 35 rotatably coupled to support structure 6. Payload device 5 is mechanically coupled to support arm 35 by means of a shaft passing through the center of a drive means and angle sensor, configured as a single unit and referred to, throughout this specification as control pack 4. Base terminal end 16 of support arm 35 is rotatably connected to support structure 6 by a control pack 4, which has a crank pin or axial pin 2 (see FIG. 7) constraining the rotation of support element 35 to be about a line passing through the center of mass, gimbal point, of payload device 5.

A wedge shaped block element 36, of FIG. 10, interposed between the second control pack 4 and base of the payload device 5 has a wedge angle F. Angle E, determined by wedge angle F and physical structure of support arm 35, is chosen so that axial pin 2 of control pack 4 at hinge terminal 17 of support arm 35 is alined to pass through the center of mass of payload device 5. The centerline of payload device 5 traces a cone of half angle E as control pack 4 at hinge terminal 17 is driven through 360 degrees of movement. It is readily seen that support arm 35 may be repositioned about that axis defined by axial pin 2 of the control pack 4 at base terminal 16 of support arms 35. By design, that axis is made to coincide with the payload's centerline when payload 5 is at its null or zero deflection position.

As support arm 35 is driven through 360 degrees of reorientation with payload device 5 at its maximum deflection, that is with hinge terminal 17's control pack 4 at 180 degrees from null, the centerline of payload device 5 traces a cone of half angle 2E. It is thus possible, by a combination of positions of the control packs 4, to set payload device 5 to any position at which its centerline is within the solid cone of half angle 2E described above.

Wedge element 36 is configured to allow control pack 4 at hinge terminal 17 to be so mounted that axial pin 2 therein (see FIG. 7) passes through the desired gimbal point G.P. G.P. is generally selected to be the center of mass of payload device 5 as explained earlier in the description of prior art.

Gimbal point G.P. is controlled by the length of support arm 35 and angle E of control pack 4 at hinge terminal 17. As support arm 35 is shortened with angle E remaining fixed, gimbal point G.P. moves down the centerline of payload device 5 towards base structure 6. Similarly, if support arm 35 is lengthened, at constant angle E, G.P. moves away from support structure 6 along the payload device's centerline. Selection of support arm length and angle E must be made in early design to accommodate alinement of rotation axes through the center of mass of payload device 5.

A means for controlling angle E to accommodate different payloads with a single gimbal design will be presented later (see FIGS. 6 and 7).

As support arm 35 is shortened, G.P. moves down the payload centerline until, when that length goes to zero, we have a distinct variant of the exocentric gimbal as pictured in FIG. 9. This variant is denominated a "skewed" gimbal to distinguish it as the limiting case of exocentric gimbal design.

FIG. 9 shows the skewed gimbal in its erected mode within the Space Shuttle on the aft bulkhead 19 of its cargo bay. This skewed gimbal utilizes three rotary joints, each comprised of a control pack 4 with the first such pack at support structure 6, the second mounted at an angle of 45 degrees on gimbal structure 36. Gimbal structural element 37 has its lower face parallel to the cut face of structure 36 and second control pack 4 allows structural element 37 to be driven to any angle plus or minus 90 degrees from its rest or null position with payload device 5 at rest in the cargo bay. Advantages of the skewed gimbal are its high "stiffness", low weight, simplest design and lowest weight of pointers, viz. gimbals, described in this specification.

Figure 3A:
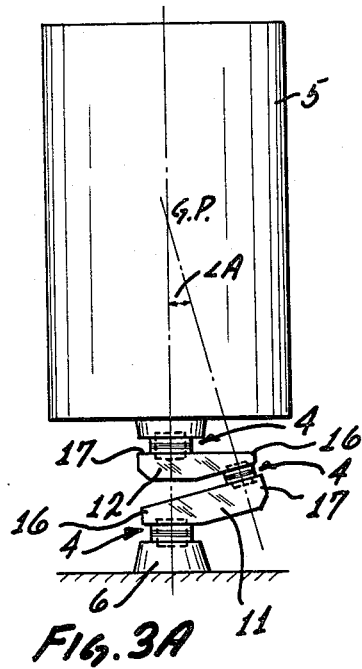
FIGS. 3A, 3B and 3C is a two support arm exocentric gimbal showing such gimbal in three different positions of support.
Figure 3B:
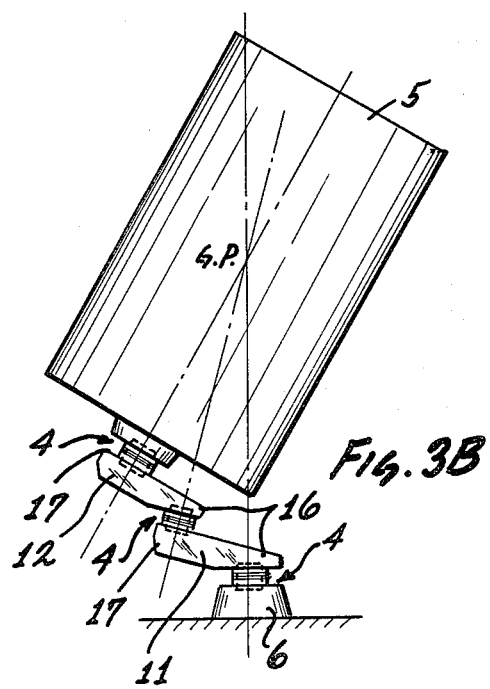
Figure 3C:
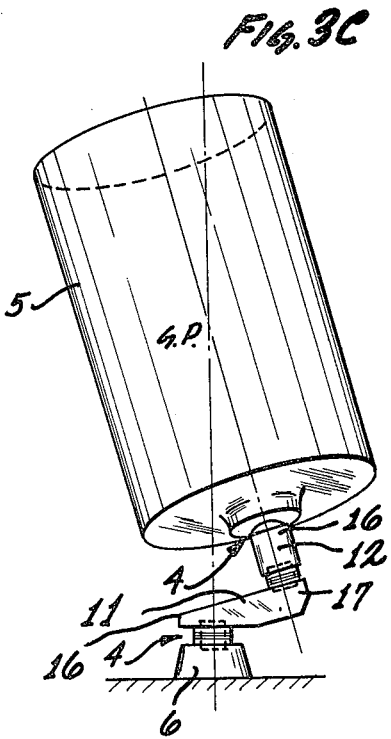

A second embodiment of exocentric gimbal is presented in FIG. 3. Here the gimbal is built with two support arms, 11 and 12, rotatably coupled together by a control pack 4. This same type of control pack may be utilized to couple the outermost support arm 11 to support structure 6, which structure may well be an elevation bar used to carry the gimbal and its associated payload device 5 from the transport bay of a Space Shuttle to a position from which reorientation of the payload is to be controlled.

Control pack 4 is usable at each rotatable juncture of gimbal elements. Payload device 5 may be coupled to inner support arm 12 by such a unit to provide a "roll" degree of freedom for the payload.

Figure 4:
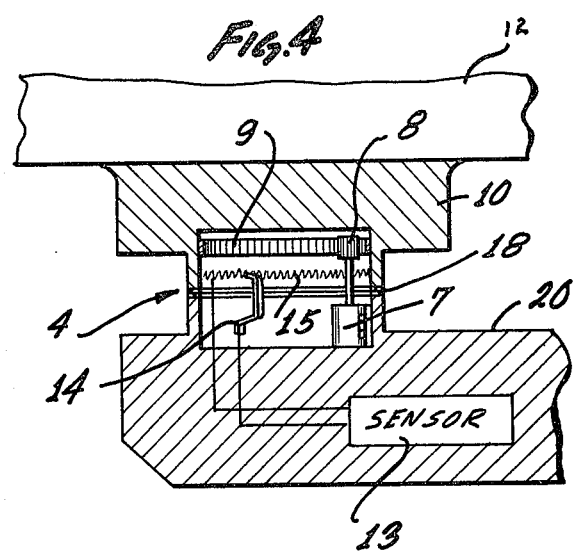
FIG. 4 is a schematic representation of typical drive means and sensor means usable with the exocentric gimbal.
Figure 7B:
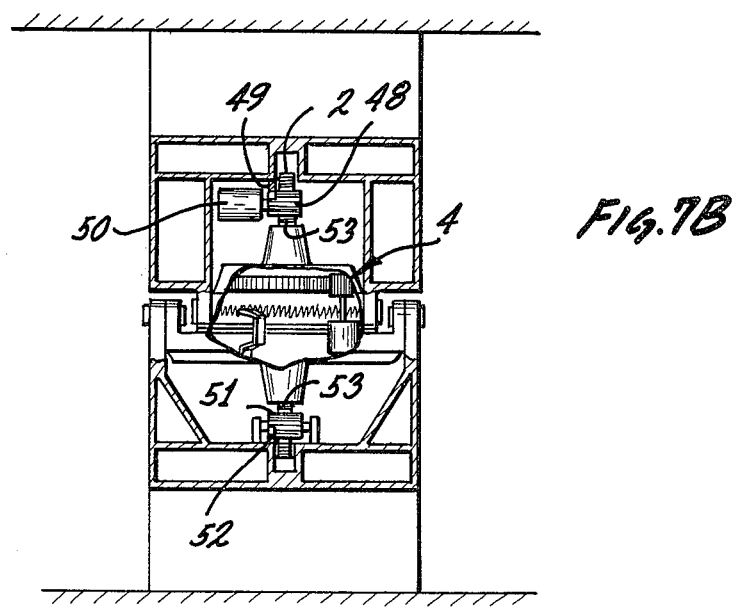

Control pack 4 is presented schematically in FIGS. 4 and 7. In FIG. 4, static element 20 may be that portion of support arm 11 of FIG. 3 which is mechanically coupled to the control pack between the support arms. Motive power applied to motive means 7 will result in rotary motion of moving element 10, physically part of support arm 12.

Support arms referred to throughout this specification may be considered angulated cranks with crank pins 2 defined as axial pins, coupling the cranks together and to structure or payload devices, as appropriate. Crank pins 2 from axes of rotation of crank shafts with respect to each other, to their support structure, and to devices to be repositioned. Fundamental to this invention is the meeting of all such axes of rotation at a common point, the gimbal point. Such a point will generally be the center of mass of the device being repositioned.

In FIGS. 3 and 4, each shaft of the angulated cranks is provided a web surface or bearing plane 18 perpendicular to the crank pin and axis of rotation of the shaft with respect to adjacent shafts. Each crank shaft has a base terminal 16 and a hinge terminal 17. The base terminal is coupled to a crank pin and has motive means to drive the shaft to desired positions. The hinge terminal has mounting provisions for the crank pin forming an axis of rotation for the following support element. This hinge terminal has provisions allowing cooperation with motive means of the preceding support element to allow the following element to be driven to different angular orientations about the crank pin of such hinge terminal.

In FIG. 3, motion of support arm 12 is constrained to be about axial pin 2 (refer to FIG. 7) which passes through control pack 4 to rotatably couple support arms 11 and 12 together. Moving element 10 (FIG. 4) is supported by static element 20 at bearing planes 18, one such plane facing the other from moving element 10 and static element 20. Such bearing planes may be in physical contact with each other through low friction bearings 3 (ref. FIG. 8) housed in extensive dimension races. In a preliminary design, bearing races of 60 inches diameter housing precision ball bearings were designed for use with the Large Space Telescope (see FIG. 8). Such a telescope is scheduled for application on early Shuttle flights. Mechanical tolerances are quite demanding for such bearings and a suitable and likely alternative may well be found in magnetic bearings or gas layers for which physical contact of opposing bearing planes is avoided and frictionless rotation is achieved.

In FIG. 4, motive means 7 is depicted as an electric motor with a splined shaft 8 engaging trunnion gear 9 fixed on moving element 10. Electric power applied to motive means 7 would cause the motor to drive moving element 10 under control of gear 8 and trunnion 9. Sensor means comprises a precision resistance potentiometer 15 excited by external precision voltage. The wiper 14 of potentiometer 15 provides a voltage to control electronics 13, the amplitude corresponding to rotary displacement of moving element 10 from a rest or reference position on static element 20.

In FIG. 4, motive means 7 and sensor means 13, 14 and 15 are representative and schematic only. Studies indicate that precision DC torquer motors of which moving element 10 provides the core for a drive coil affixed to static element 20, would be a suitable option as would hydraulic motor means and electrostatic drivers. Sensor means would most probably be of a photo-optic type with resolutions as fine as ±0.01 arc seconds. The means shown are symbolic of many motive/sensor systems available for use. Novelty of this invention does not reside in such systems or means and they are presented as part of the preferred embodiment to complete the operational device presented as this invention.

Figure 1:
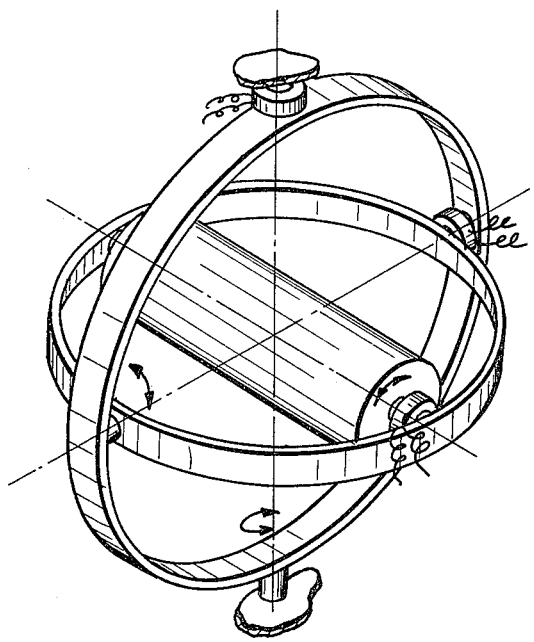
FIG. 1 presents a conventional 3 degree of freedom gimbal, typical of those used for attitude sensing gyroscopes.
Figure 2:
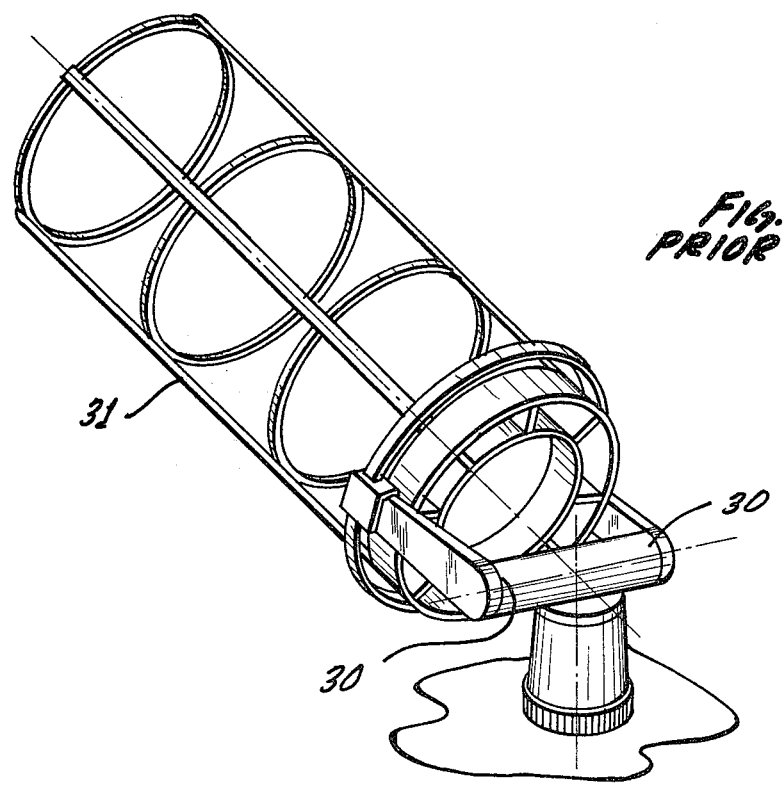
FIG. 2 presents a different type of conventional three degree of freedom gimbal typical of those used to reorient extended dimension articles.

Bearing planes 18 (see FIG. 7A) can be designed with extensive load carrying surfaces. A significant advantage of the exocentric gimbal over conventional gimbal pointing systems is the perpendicular orientation of bearing planes 18 to axial pins 2 passing through payload device 5's center of gravity at G.P. Inertial disturbances from payload 5 are supported primarily by the bearings at 18 rather than by the gimbal's motive means, as occurs in the conventional gimbals of FIGS. 1 and 2. In FIG. 2, for example, the elevation drive trunnion joints 30 are parallel to the centerline of the payload 31 shown so that inertial disturbances from payload 31 are resisted by the elevation motor proper without assistance from the bearings.

In the within invention, bearing planes 18 are designed to be of large area so that disturbances will be distributed over the planes proper and not concentrated at the juncture of the drive means and driven element such as at gear 8 and trunnion 9. Concentration of stresses at such points result in a "dither" of the drive means 7 as overcorrections and new stresses coincide.

In FIGS. 3 and 4, bearing planes 18 are inclined at angles A with respect to support base 6 upper surface and the reference plane of that set of bearing planes immediately preceding it in the chain of support arms 11, 12 to support structure 6 from payload device 5. Angle A and the physical length of the support arm carrying drive/sensor pack 4 are integrally related to the physical dimensions and mass distribution of payload device 5. Axial pins 2, perpendicular to bearing planes 18, must be in line with the payload center of mass G.P. for purposes of this invention.

FIGS. 6 and 7 present means to change the point of intersection of the axes of rotation of support arms in the various configurations of exocentric gimbal. In FIGS. 6 and 7 are shown means to control the angle of bearing planes 18 and to alter the angle of axial pins 2 so that the same length support arms may be used with different dimension payloads. FIG. 6A presents a typical combination of support arms 21 and 22 mechanically coupled to support structure 6 and payload device 5. Conventional control packs 4 are used to rotatably couple gimbal elements to each other. At the outer extreme of support arms 21 and 22 is mounted bearing plane shifter 23. Plane shifter 23 is used to control the alinement of the centers of adjustable joints 24, 25 and 26.

Adjustable joints 24, 25 and 26 are of the same general type and serve similar purposes. A grooved shaft 27 is solidly fixed in structure of support arms 21 and 22 as well as in that structure 29 coupling control pack 4 to support arm 21. Such shafts may well be grooved bores through the structure, sized to accept pins mechanically integral with joints 24, 25 and 26. Such pins may have splines mating with the grooves in shafts 27. To vary inclination of pins 2, that is to cause the axis of pin 2 to intersect centerline of the payload at a different G.P., pins coupled to joints 24, 25 and 26 are removed and binder plate 28 is physically moved to the position giving the new intersection of axial pins 2 with the payload axis. Splined pins associated with joints 24, 25 and 26 are then inserted into the appropriate grooves of shafts 27 and sealed with locking devices of suitable type.

Spacing of grooves and mating splines determines fineness of angle adjustment. Outer circumference of pins associated with joints 24, 25 and 26 and the inside diameter of shafts 27 determine fineness of adjustment of bearing plane shifter angles and the consequent displacement of G.P., which displacement is proportional to the change in angle multiplied by the distance between the original G.P. and point of intersection of pin 2 with bearing planes 18. For small displacements and large distances, the sine of the displacement angle approximates the displacement angle and the arc subtended by the displacement angle approximates that distance multiplied by the displacement angle itself.

Adjustment of bearing plane angles is done by manually setting joints 24, 25 and 26, FIG. 6, with the splines and grooves of both plane shifters 23 of the three support arm gimbal. Care must be exercised in setting equal joint changes to ensure that the new orientation of axial pins 2 is such that the centerline of the pins (axes of rotation) intersect at the desired new gimbal point.

FIG. 7 illustrates a second means for reorienting axial pins 2 and bearing planes 18. Here, control pack 4 is mounted on a collinear pair of trunnion joints, 52 lower, and 49 upper. Passing through the center of control pack 4 is axial pin 2 whose angle is shifted as motive power is supplied to motive device 50 and gears 48 and 51 are driven in opposite directions on their respective trunnions. As axial pin 2 is reoriented, control pack 4 maintains bearing planes 18 perpendicular thereto and a new gimbal point G.P. is created along payload device 5's centerline.

Inherent in the exocentric gimbal is an amplification factor for accuracy of positioning a payload centerline (i.e. reorientation). In FIG. 3, if angle A were equal to 30 degrees, support arm 12 would have to be driven through 180 degrees to give a reorientation of 60 degrees to payload device 5. About 3 degrees of support arm rotation is required for each degree of payload reorientation.

FIG. 8 presents a series combination of control packs 4 and 41. Dimensions given in FIG. 8 are typical of those to be used for a Large Space Telescope payload, planned for use on the Space Shuttle. A coarse poiner gimbal angle A of 10 degrees is shown as the angle of inclination of axial pins 2 in support arm control pack 4 to payload device 5 centerline. A payload roll joint 40 is shown which allows reorientation of the payload 5 about its own axis as that axis mates with fine control pack 41.

Fine control pack 41 is a wedge shaped unit with a small wedge angle B. Configured generally as the control packs 4 referred to throughout the specification, it includes drive means and sensor means to determine it reorientation from the "rest" or null position on the control pack 4 attached to end 17 of support arm 42. Fine control pack 41 is rotatable about an axis displaced from the axis of the control pack 4 affixed to support arm 42 by the angle B. Angle B is a small angle.

With support arm 42 displaced from its null with respect to the second support arm of the gimbal, fine control pack 41 can be commanded through up to 360° of rotation during which the centerline or pointing axis of the payload device will trace out a cone of half angle B. Great accuracy of pointing derives from this fine control pack rotation wherein the payload axis is reoriented by angle B while fine control pack motion is through 180°. Amplification factor is thus 180/B so that fine angles can be achieved as described below.

When control pack 41 is at its null with respect to support arm 42, bearing plane 18 is inclined at a fine gimbal angle B of 1.432 degrees from a perpendicular to the payload centerline. For the Large Space Telescope, such an angle subtends a chord B of 5.5 inches a fine sensor control pack 41, this chord comprising the support arm length of control pack 41.

The coarse pointer gimbal arrangement of FIG. 8 must provide an accuracy of ±4 arcseconds to provide for a payload pointing accuracy of ±0.1 arcseconds. Amplification factor K is equal to 1/sin 1.432° or ±40. For a payload position accuracy of ±0.1 arcsecond, actuator accuracy must be K×0.1=4 arcseconds. It will be readily seen that a 10 fold increase in payload positioning accuracy can be achieved by reducing fine gimbal angle B to approximately 0.286° giving a K of 200 and requiring a coarse gimbal accuracy of ±2 arcseconds.

In operation, it will seldom be necessary for the wedge shaped fine pointer to be driven more than a few degrees from its null, since coarse pointer operation allows the fine pointer to be reset through its own (coarse pointer's) repositioning.

FIG. 5 presents an embodiment of this invention utilizing three support arms, of which the outermost 32 is coupled to middle arm 33 through a control pack 4, to innermost arm 34. Angle of inclination of axial pins 2 (refer to FIG. 7) to the centerline of payload device 5, corresponding to angle A of FIG. 3, is, in FIG. 5, approximately 30 degrees. After 180 degrees of displacement of support arm 33 with respect to arm 32 and 180 degrees of arm 34 with respect to arm 33, payload device 5 is reoriented as in FIG. 5C to approximately 150 degrees displacement from its original position in FIG. 5A.

Bearing plane shifters 23 can well be employed at the control packs 4 between support arms 32 and 33, and between support arms 33 and 34.

Variations of components, values and dimensions will present themselves to one skilled in the art of gimbals and pointing mechanisms, as natural requirements to meet specific applications of the device presented herein.

Such variations fall within the scope of this invention for which the following is claimed:

1. An article positioning apparatus comprising:
   a mounting base, and
   an angulated crank having first and second crank shafts, said first crank shaft rotatably attaching said angulated crank to said mounting base, said second crank shaft rotatably attaching said article to said crank, the axes of said crank shafts being non-parallel and intersecting at a point near the center of mass of said article.

2. An article positioning apparatus comprising, in combination:
   a mounting base;
   a plurality of support elements;
      each of said elements comprising an angulated crank having a crankshaft at each end thereof;
      said elements successively, rotatably coupled together by means of said crankshafts;
      the first of said elements rotatably connected to said mounting base by means of one of its crankshafts;
      the last of said elements so connected as to support a pointable article;
   all support elements rotating about axes defined by said crankshafts, with all said axes intersecting at or near a single point.

3. An article positioning apparatus comprising, in combination:
   an article having a pointing axis;
   a mounting base;
   a plurality of support elements;
      each of said elements comprising an angulated crank having a crankshaft at each end thereof;
      said elements successively, rotatably coupled together by means of said crankshafts;
      the first of said elements rotatably connected to said mounting base by means of one of its crankshafts;
      the last of said elements so connected as to support said article;
   a wedge shaped element rotatably disposed between the last support element and said pointable article;
   said wedge shaped element having first and second faces inclined to each other at a small angle;
   axis of rotation of said wedge shaped element being displaced at a small angle from the pointing axis of said article;
   all support elements rotating about axes defined by said crankshafts, with all said axes intersecting at or near a single point.

4. An article positioning apparatus comprising, in combination:
   an article having a pointing axis;
   a mounting base;
   a plurality of support elements;
      each of said elements comprising an angulated crank having a crankshaft at each end thereof;
      said elements successively, rotatably coupled together by means of said crankshafts;
      the first of said elements rotatably connected to said mounting base by means of one of its crankshafts;
      the last of said elements so connected as to support said article;
   all support elements rotating about axes defined by said crankshafts, with all said axes intersecting at or near a single point, including means to adjust the location of said single point.

5. The apparatus of claim 3 including means to adjust the location of said single point.

6. The apparatus of claims 3, 4 or 5, wherein is included a crank fixedly attached to said article and rotatably attached to said last element.

7. The apparatus of claims 3, 4 or 5, wherein is included a crank rotatably attached to said article and rotatably attached to said last element.

8. The apparatus of claim 3 wherein said single point is the center of mass of said article.

9. The apparatus of claims 3 or 4, including bearing means disposed between and cooperating with adjacent support elements at the general location of said crankshafts.

* * * * *